US006871199B1

(12) United States Patent
Binnig et al.

(10) Patent No.: US 6,871,199 B1
(45) Date of Patent: Mar. 22, 2005

(54) PROCESSING OF TEXTUAL INFORMATION AND AUTOMATED APPREHENSION OF INFORMATION

(75) Inventors: Gerd K. Binnig, Wollerau (CH); Peter Bloechl, Adliswil (CH); Juergen Klenk, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 09/310,650

(22) Filed: May 12, 1999

(30) Foreign Application Priority Data

Jun. 2, 1998 (EP) .......................... 98109952

(51) Int. Cl.⁷ ........................... G06F 17/30; G06F 7/00
(52) U.S. Cl. ............................ 707/5; 704/9
(58) Field of Search .................. 704/2–7, 9; 707/3–5

(56) References Cited

U.S. PATENT DOCUMENTS

| 4,868,733 A | * | 9/1989 | Fujisawa et al. ............... 707/5 |
| 5,404,506 A | * | 4/1995 | Fujisawa et al. ............... 707/4 |
| 5,418,942 A | * | 5/1995 | Krawchuk et al. ............. 707/3 |
| 5,424,947 A | * | 6/1995 | Nagao et al. .................. 704/9 |
| 5,694,523 A | * | 12/1997 | Wical ........................... 706/45 |
| 5,802,508 A | * | 9/1998 | Morgenstern ................ 706/55 |
| 5,870,751 A | * | 2/1999 | Trotter ....................... 707/102 |
| 6,029,123 A | * | 2/2000 | Suda et al. .................... 704/9 |
| 6,038,560 A | * | 3/2000 | Wical ........................... 707/5 |
| 6,052,656 A | * | 4/2000 | Suda et al. .................... 704/9 |
| 6,101,515 A | * | 8/2000 | Wical et al. ................. 707/531 |

FOREIGN PATENT DOCUMENTS

| EP | 0 467527 A2 | * | 1/1992 | ........... G06F/15/38 |
| EP | 0 638870 A1 | * | 2/1995 | ........... G06F/17/30 |
| EP | 0 689 147 A2 | | 12/1995 | |
| GB | 2302420 A | * | 1/1997 | ........... G06F/17/30 |
| JP | 4-139580 A | | 5/1992 | ........... G06F/15/40 |
| JP | 5-342255 A | | 12/1993 | ........... G06F/15/38 |

OTHER PUBLICATIONS

Cohen, P.R., and Loiselle, C.L. "Beyond ISA: Structures for Plausible Inference in Semantic Networks", Proceedings of the 7th National Conference on Artificial Intelligence, AAAI–88, 1988, pp. 415–420.*
Harabagiu et al. "A Parallel Algorithm for Text Inference", Proceedings of the 10th IEEE International Parallel Processing Symposium, Apr. 15–19, 1996, pp. 441–445.*
Salton et al. "Automatic Text Decomposition Using Text Segments and Text Themes", Proceedings of the 7th ACM Conference on Hypertext, Mar. 16–20, 1996, pp. 53–65.*

(List continued on next page.)

Primary Examiner—Luke S Wassum
(74) Attorney, Agent, or Firm—Thu Ann Dang; Ryan, Mason & Lewis, LLP

(57) ABSTRACT

Scheme for the automated apprehension of textual information conveyed in an input string. The input string is segmented to generate segments and/or semantical units. The following steps are repeated for each segment in the input string until a subset for each segment in said input string is identified:

a. identifying a matching semantical unit in a fractal hierarchical knowledge database of semantical units and pointers, said matching semantical units being deemed to be related to a segment of said input string, b. determining the fitness of said matching semantical unit by taking into consideration said semantical unit's associations, c. defining a subset of information related to said matching semantical unit within said fractal hierarchical knowledge database.

Then these subsets are combined to form a resulting semantic network.

63 Claims, 10 Drawing Sheets

OTHER PUBLICATIONS

Chung et al. "Parallel Natural Language Processing on a Semantic Network Array Processor", IEEE Transactions on Knowledge and Data Engineering, vol. 7, No. 3, Jun. 1995, pp. 391–405.*

Moldovan et al. "SNAP: A Marker–Propagation Architecture for Knowledge Processing", IEEE Transactions on Parallel and Distributed Systems, vol. 3, No. 4, Jul. 1992, pp. 397–410.*

Moldovan et al. "SNAP: Parallel Processing Applied to AI", IEEE Computer, vol. 25, No. 5, May 1992, pp. 39–49.*

McMath et al. "A Graphical Thesaurus–Based Information Retrieval System", International Journal of Man–Machine Studies, vol. 31, No. 2, Aug. 1989, pp. 121–147.*

R.V. Guha et al., "Enabling Agents to Work Together," Communications of the ACM, vol. 37, No. 7, pp. 127–142, Jul. 1994.

M. Chung et al., "Applying Parallel Processing to Natural–Language Processing," IEEE Expert, vol. 9, No. 1, pp. 36–44, Feb. 1994.

* cited by examiner

PROCESSING OF TEXTUAL INFORMATION AND AUTOMATED APPREHENSION OF INFORMATION

TECHNICAL FIELD

The invention concerns the automated apprehension of textual information conveyed in an input string, the structure of a special knowledge database used in this context, and systems based thereon.

BACKGROUND OF THE INVENTION

In their attempts at automated apprehension of the meaning of speech and text, neither linguists nor computer scientists have made much progress. In our opinion they have concentrated too much on the logical structure of the texts themselves and have neglected the structure of the world. Speech and textual information are obviously based on the structure of the world and refer to it.

Quite some progress has been made in phonological and/or phonetical, lexical, morphological, and syntactical analyses of natural language processing. However, when it comes to understanding the meaning of speech, i.e. the semantical interpretation of speech, the breakthrough has not yet been achieved. As a consequence, the pragmatical analysis, the control of tools and devices by natural speech, has also not been developed very far.

A typical example of a modern speech/text recognition system is described in the article "Enabling agents to work together", by R. V. Guha et al., Communications of the ACM, Vol. 37, No. 7, July 1994, pp. 127–142, and reviewed by T. J. Schult in the German article "Transparente Trivialit äten; Cyc-Wissensbasis in WWW", c't, 1996, Vol. 10, pp. 118–121. The Cyc-system described by R. V. Guha is a knowledge based system for true/false categorization of input statements. T. J. Schult points out in his article that the knowledge representation in the database used in the Cyc-system is not standardized and uses only the following relations for deduction: 'is element of', 'is subset of', and 'has subsets'.

It is an object of the present invention to provide a new structure for the representation of knowledge in a database.

It is an object of the present invention to provide a new structure for the representation of knowledge in a database that allows for ease of knowledge increase ("learning") and/or ease of knowledge retrieval ("understanding").

It is another object of the present invention to provide systems based on a new structure for the representation of knowledge in a database.

SUMMARY OF THE INVENTION

The present invention concerns the processing of textual information conveyed in an input string together with information contained in a knowledge database. The knowledge database represents a network of hierarchically arranged semantical units which are similar across hierarchies. According to the present invention, the input string is segmented into segments. These segments are then combined with semantical units from said knowledge database to generate a resulting semantic network. This resulting semantic network comprises hierarchically arranged semantical units which are similar across hierarchies.

The present invention further concerns a specific fractal hierarchical knowledge database for use in connection with the automated apprehension of information and an apparatus for the processing of textual information conveyed in an input string together with information contained in a knowledge database.

Furthermore, the present invention concerns the processing of textual information conveyed in an input string together with information contained in a knowledge database for the automated apprehension of information.

Advantages of the present invention are addressed in connection with the detailed description or are apparent from the description.

DESCRIPTION OF THE DRAWINGS

The invention is described in detail below with reference to the following schematic drawings.

DESCRIPTION OF PREFERRED EMBODIMENTS

In the following, the basic concept of the present invention is described. Before addressing different embodiments, the relevant terms and expressions are defined and explained.

The words "interpretation" and "apprehension" are herein used to describe a process which starts with an input string, e.g. some sentences and/or questions, and analyzes the textual information (also referred to as original information) conveyed by, or carried in this string and creates an appropriate output, such as a summary, an answer, a question, a speech, or a action/reaction. The present inventions achieves this by converting the input string into segments and/or semantical units. Then, the segments or semantical units are related with (corresponding) information in a knowledge database yielding a resulting semantic network that is a representation of the input information. By inverting the resulting semantic network one can create a human-understandable output. The inventive approach allows for an automated apprehension of the meaning and/or the information conveyed in an input string and possibly for an appropriate answer and/or reaction.

The expression "textual information" is defined to be any kind of written information, or information contained in speech. "Textual information" is not limited to human-readable or human-understandable. This expression is also meant to cover program strings, e.g. in machine readable form, or encoded information, e.g. as transmitted through a network.

The expression "theme" is herein used to describe the area, field, matter, topic, or subject to which the original information is deemed to be related.

A crucial component of the present invention is the so-called knowledge database which is addressed in the following sections. This knowledge database has a novel and unique structure.

Figure 1:
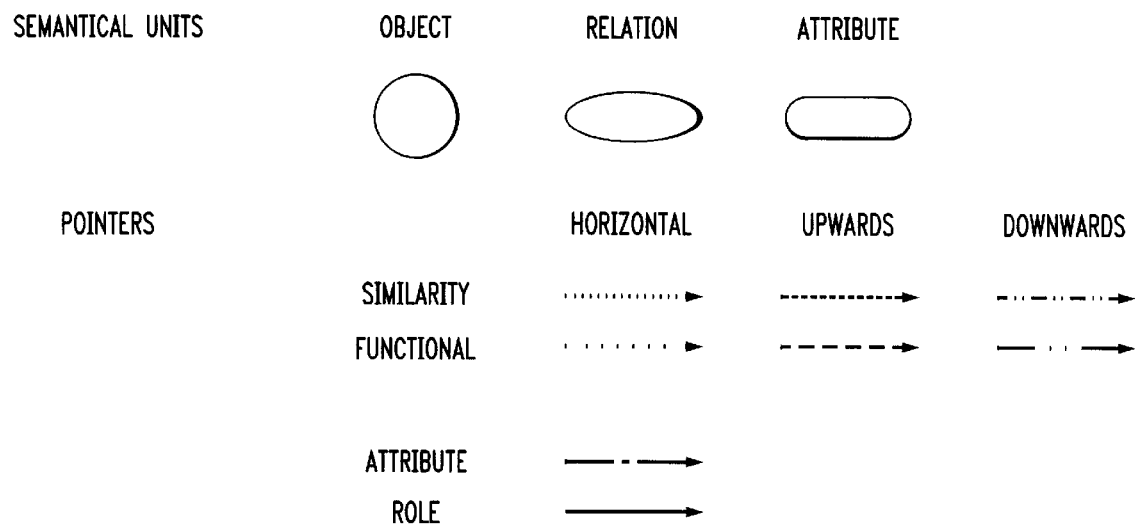
FIG. 1 shows the elements (semantical units and pointers) of a fractal hierarchical knowledge database, in accordance with the present invention. Note that a pointer can be a semantical unit, in which case the semantical unit is drawn on top of the pointer.

Knowledge database: A knowledge database is a kind of library describing the knowledge of the world, or a particular area of interest thereof, by using a well-defined structure that consists of components such as possible relevant types of semantical units and their possible mutual connections, as schematically illustrated in FIG. 1. The inventive knowledge database consists of semantical units and various types of pointers between semantical units, where the pointers themselves may be regarded as semantical units. Each pointer may carry a fixed or variable weight (herein also called semantical distance), where the inverse of the weight of a pointer represents some kind of semantical distance between the two semantical units it connects, i.e., it represents the degree of (semantical) association between the two semantical units across this particular link.

Since the weights used in connection with the present invention are attached to the links, it is clear which two semantical units' semantical distance they correspond to. Weights are not compared, but used to compute the semantical distance of any two linked semantical units (the two semantical units may be connected through further semantical units, their semantical distance then being the product or some other suitable combination of the individual distances). Thus, this concept of semantical distance establishes a metric on the knowledge database. Finally, it is advantageous to use a variable or fixed threshold below which connections are ignored. So if two semantical units are connected through (for instance) three links (thus involving two more semantical units), and the product or other suitable combination of the three weights is below the threshold, then one can assume that there is no association between the two semantical units. This method allows to make the network local, i.e., each semantical unit has only a limited number of associations and the local network structure around each semantical unit is not too difficult. For example, there are no loops which could cause contradictions. A local network is herein also referred to as a subset.

Furthermore, the weights used herein might be variable. This means that the weights can be adjusted depending on the given/presumed theme. Certain rules for adjusting the weights according to the given/presumed theme might be stored with the links to which the respective weights are attached.

Semantical units in the knowledge database and/or in the resulting semantical network may carry a "potential". If a semantical unit carries a potential it corresponds to the semantical unit's importance in relation to the segment or semantical unit from the input string currently under investigation.

The "matching link" from a segment or semantical unit to a semantical unit in the knowledge database may carry a "fitness". If a matching link carries a fitness it corresponds to the classification probability, i.e. the probability that the segment or semantical unit from the input string has been correctly matched with a semantical unit in the knowledge database.

When referring to a knowledge database, either a library describing knowledge of the world, or a library with application specific information is meant. The knowledge database is herein also referred to as world library. An example of an application specific knowledge database is a database which comprises information relevant for the processing of insurance claims. An example of such a knowledge database will be given later.

The knowledge database reflects the knowledge of the world or the knowledge of a certain area or field. The content of this knowledge database always forms a subset of the content of the real world, corresponding to a limited life experience of the computer and the human being who programmed the computer. However, a knowledge database can be expanded either by automated learning from analyzed input, or by adding separately obtained sub-worlds (e.g. in the form of application-specific modules). It is conceivable to provide updates for the knowledge database through an intranet or internet. Likewise, one might for example link a particular knowledge database when processing a piece of literature, or when analyzing a computer program.

The structured representation of aspects of the world with the knowledge database is achieved by a multiscale approach related to the work of B. Mandelbrot and K. Wilson. Self-similar representations are used on different scales to describe the behavior of objects in a dynamical hierarchical network, as will be described in connection with an example (see FIG. 4). Furthermore, self-similar algorithms are used when making use of the knowledge contained in this database. However, the inventive approach goes beyond the theory of B. Mandelbrot and K. Wilson and predominantly deals with the behavior of elements and structures rather than with their appearance.

It is to be noted that there is a fundamental difference between knowledge and understanding. One can accumulate arbitrary amounts of knowledge without having any understanding, while the converse is not possible. Knowledge is the isolated representation of pure facts, while understanding arises from strong connections between isolated facts, and from abstraction. The database described in R. V. Guha's paper has a large amount of knowledge but only a small amount of understanding, because the links in this database appear in its network of topics, while all the individual entries are not connected among each other.

The inventive knowledge database is a complex fractal hierarchical network of semantical units and pointers.

Fractal hierarchical network: A network consists of nodes (here called semantical units) and links (here called pointers) between the nodes. A network is called hierarchical if there are links of the type " . . . is kind of x" (hyponyms), "x is kind of . . . " (hypernyms), " . . . is part of x" (meronyms), and "x is part of . . . " (holonyms) for a given node x, where the first and second relation type groups several nodes by their similarity to one new node, and the third and fourth relation type groups several nodes by their functional connection to one new node. Examples are: a desk chair, an armchair, and a rocking chair are all grouped in the semantical unit 'chair' by their similarity (they are all chairs), while a backrest, a leg, and a seat are all grouped in the semantical unit 'chair' by their functional connection (they are all functional parts of a chair).

A hierarchical network is called fractal if the following four conditions are satisfied:

All nodes are similar (derived from one template).
All links are similar (derived from one template).
Links may also be nodes.
Hierarchical links are possible, and at least one node must have a hierarchical link.

The construction of a fractal hierarchical network, according to the present invention, is achieved as follows. The network is given by a list of semantical units and pointers, as illustrated in FIG. 1. There might be different types of semantical units (objects, relations, and attributes, as defined later) and pointers (similarity pointers, functional pointers, attribute pointers, and role pointers, also defined later). These pointers can be oriented upwards, downwards, or horizontally (Note that these directions are used to better define the hierarchical structure of the network, e.g. downward pointers point to a lower hierarchical level). The various semantical units are interconnected in various ways. Some of the pointers are hierarchical representing the multiscale approach. Knowledge is presented in the knowledge database as an associative network. According to the present invention, segments and/or semantical units derived from an input network are matched with entries in the knowledge database. As discussed above, the knowledge database is of hierarchical nature and all elements are alike, so that the network has a fractal hierarchical structure. Algorithms can operate on elements at any hierarchical level in the same way, making them 'fractal' algorithms. In addition, every semantical unit is linked to its associative semantical unit. These associative links reflect how one understands each semantical unit. It is important to note that these pointers can exist between any two semantical units. The pointers themselves may be regarded as semantical units that can have pointers to other semantical units, reflecting the fact that something could act on the association between two semantical units rather than on the individual semantical units. According to the present invention, the complex structure of the world is significantly simplified through the fractal organization of the knowledge database. This also greatly simplifies the data entry into the knowledge database as one only needs to properly define the individual semantical units, and the complex network is created automatically by the individual definitions together with the possible inheritance rules originating from the fractal hierarchical structure.

Semantical units: A semantical unit is a set that contains one or several pieces of information. It may be represented by a word, an object, a relation, an attribute, a combination of words and/or objects and/or relations and/or attributes, a (hierarchical) network of words and/or objects and/or relations and/or attributes, a part of a sentence or a whole sentence, a part of a paragraph or a whole paragraph, or a part of a story or a whole story.

Semantical units in the knowledge database: In the knowledge database semantical units are used as in the above definition. A semantical unit is given by a word or a phrase (representing the name) and by all the pointers attached to it. For the present implementation we define 3 types of semantical units: objects, relations, and attributes. Note that it is also possible to define a larger or smaller number of semantical units, e.g. such that attributes are part of objects or relations.

object: Semantical units of this type correspond to individual semantical units that exist independently of other semantical units. Every object might have a set of pointers to other objects. Each pointer may have a weight corresponding to the semantical distance of the two objects it connects. Every object might have a set of pointers to other relations which correspond to the possible relations the object can play a role in. Each pointer might have a weight corresponding to the semantical distance of the object and the possible relation it can play a role in. Every object might have a set of pointers to other attributes which correspond to the possible attributes the object can take. Each pointer might have a weight corresponding to the semantical distance of the object and the possible attribute (i.e. the importance of the attribute for the object).

Note that each of these pointers is in fact a special type of relation and can thus be pointed at by other semantical units. This reflects the fact that some semantical unit may take influence on a possible relation or possible attribute of an object.

relation: Semantical units of this type correspond to semantical units that represent relations of any kind between semantical units of all types. Every relation might have a set of pointers to other relations. Each pointer may have a weight corresponding to the semantical distance of the two relations it connects. Every relation might have a set of pointers to other objects which correspond to the possible roles the object can play in the relation. Each pointer might have a weight corresponding to the semantical distance of the relation and the possible role (i.e. the importance of the role for the relation) Every relation might have a set of pointers to other attributes which correspond to the possible attributes the relation can take. Each pointer might have a weight corresponding to the semantical distance of the relation and the possible attribute (i.e. the importance of the attribute for the relation).

Note that here also each of these pointers is in fact a special type of relation and can thus be pointed at by other semantical units.

attribute: Semantical units of this type correspond to semantical units that represent detailed information about particular states of objects and relations. Every attribute might have a set of pointers to other attributes. Each pointer may have a weight corresponding to the semantical distance of the two attributes it connects. Every attribute might have a set of pointers to possible values of the attribute. Each pointer might have a weight corresponding to the semantical distance of the attribute and the possible value. Values are attributes. They may be arranged on a one- or multidimensional scale to represent their mutual semantical arrangement. Time and space may be attributes. If pointed at by an object, they refer to the time and space when and where an object exists or is valid; if pointed at by a relation they refer to the time and space when and where a relation takes place; and if pointed at by an attribute they refer to the time and space when and where a state is assumed.

Note that here also each of these pointers is in fact a special type of relation and can thus be pointed at by other semantical units.

Classes of pointers: The pointers can be viewed as directed associative connections between semantical units. Some of them establish the hierarchical structure. The knowledge database according to the present invention might comprise the following classes of pointers:

Hierarchical pointers: There are two kinds of hierarchical pointers (see FIG. 1), hierarchical classes (similarity pointers) and hierarchical structures (functional pointers). Both kinds can point either in upward or downward direction, corresponding to hierarchical associative connections.

Horizontal pointers: There are two kinds of horizontal pointers (see FIG. 1), similarity and functional pointers, corresponding to non-hierarchical associative connections.

Attributional pointers: This is one kind of pointer, corresponding to possible attributional associative connections (e.g. semantical units pointing at other semantical units which can be their possible attributes). Note that an attributional pointer may be regarded as a special kind of horizontal or hierarchical pointer.

Role pointers: This is one kind of pointer, corresponding to possible role of associations (e.g. semantical units pointing at other semantical units which can occupy their possible roles). Note that a role pointer may be regarded as a special kind of horizontal or hierarchical pointer.

All pointers may be regarded as semantical units and, therefore, might have the same classes of pointers attached to themselves. This corresponds to the complexity of associations in the real world.

The structure of the inventive knowledge database extends the object-oriented concept in the following sense. One might have an object (or class) "car" in the inventive knowledge database, and in a given input string one may find an instance of this class, a specific car, say, "Mr. Dent's Ford". Then (as an instance) "Mr. Dent's Ford" carries all the data and member functions of the class "car". However, not all data may be specified, for instance, the color may not be specified and it must not be set to any default value (e.g. red) by the constructor. Even worse, "Mr. Dent's Ford" may carry data that is not defined in the class "car", because this knowledge is not yet known to the knowledge database. So the object "Mr. Dent's Ford" is only what is called an "approximate" instance of the class "car".

Another general problem is inheritance. Only subclasses can inherit definitions from their superclasses. So if one wants to employ the concept of inheritance in strict object-oriented terminology, all entries in the inventive knowledge database must be individual classes, some of them subclasses of others. However, this does not allow for "horizontal/associative" connections because two classes cannot be connected by a link (only their instances can).

Figure 2A:
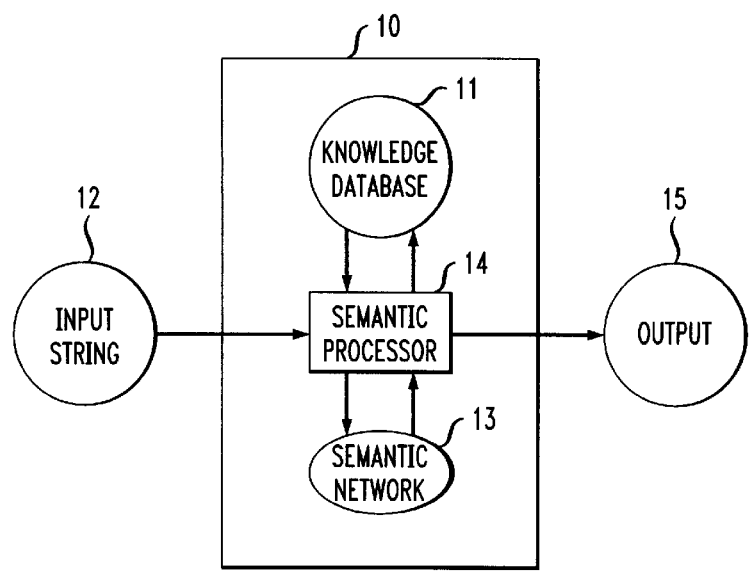
FIG. 2A is a schematic block diagram of a first embodiment, in accordance with the present invention.

First embodiment: According to the present invention, an input string 12 (e.g. a text or a speech) is transformed into a semantic network 13 of semantical units, as illustrated in FIG. 2A. This might be done by a semantic processor 14 in conjunction with a knowledge database 11. The semantic processor 14 transforms the resulting semantic network 13 into an appropriate output 15 (e.g. a text or a speech or a reaction).

Figure 2B:
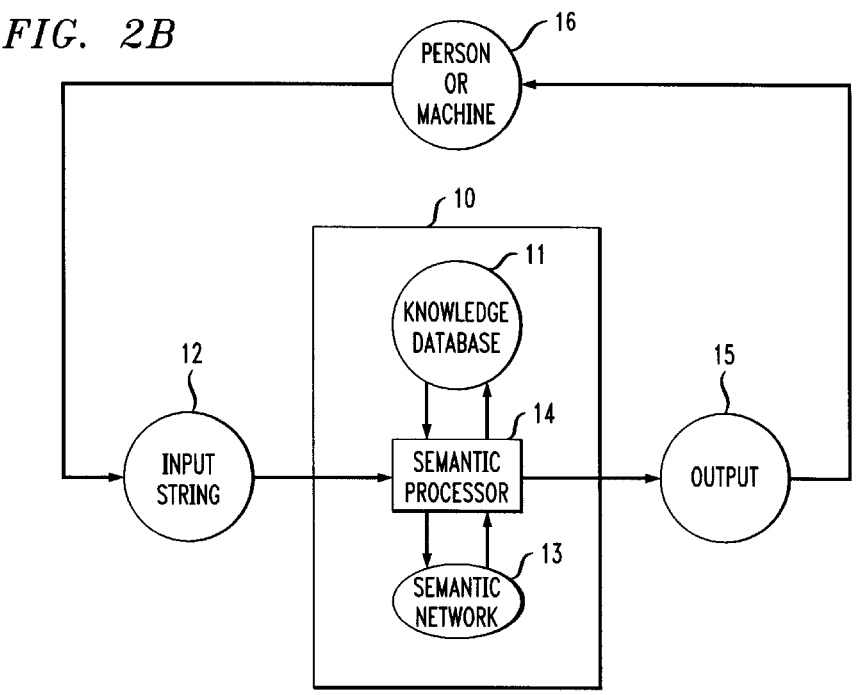
FIG. 2B is a schematic block diagram of a second embodiment, in accordance with the present invention.

Second embodiment: The second embodiment adds one or several persons and/or one or several machines of type 10 to the first embodiment, closing the interaction cycle so that an extended communication can take place, as illustrated in FIG. 2B.

Figure 2C:
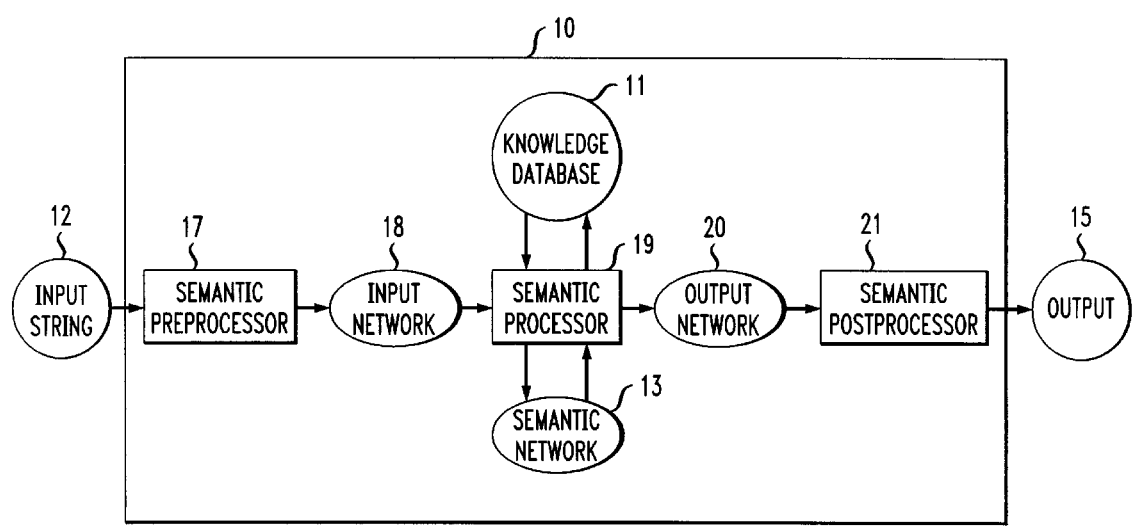
FIG. 2C is a schematic block diagram of a third embodiment, in accordance with the present invention.

Third embodiment: According to the present invention, an input string 12 (e.g. a text or a speech) is transformed into a formal network 18 (herein also referred to as input network) of semantical units, as illustrated in FIG. 2C. This might be done by a semantic preprocessor 17. There are various conventional techniques for this transformation, as will be addressed below.

Semantic preprocessor: The semantic preprocessor 17 transforms an input string 12 into an input network 18 (formal network). A semantic preprocessor, as used in connection with a speech recognition system for example, might consist of four parts:

I. Voice recognition software to transform speech into an input string. This feature is optional as the input data may already be presented in written form.

II. Syntactic (Chomskyan) parser to create a constituent structure of the input string.

III. Grammatical parser to create a functional structure of the input string's constituent structure. The grammatical theories of Lexical Functional Grammar or General Phrase Structure Grammar provide possible frameworks for this step.

IV. Transformer (scope analyzer) to resolve language issues such as pronouns, direct and indirect speech, relative clauses etc. It creates the input (formal) network from the functional structure. The logical Discourse Representation Theory provides one possible framework for this step.

The behavior of a semantic preprocessor is explained below in connection with an example illustrated in FIGS. 3A–3C:

Speech: "Mike was a young boy. Every morning he walked to school."

Input string: Mike was a young boy. Every morning he walked to school.

Constituent structure: Parser creates tree structure. Since there are two separate sentences, the parser creates two trees, as illustrated in FIG. 3A.

Functional structure: Parser identifies functions of words, as schematically illustrated in FIG. 3B.

Formal network: Transformer resolves pronoun 'he'. An example of a formal network is illustrated in FIG. 3C.

Figure 3A:
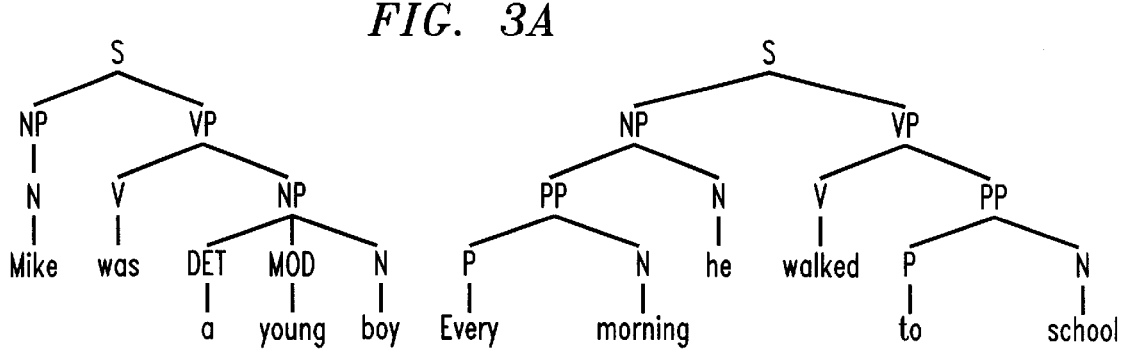
FIGS. 3A-3C illustrate how an input string can be transformed into an input network, in accordance with a first embodiment of the present invention.

As shown in FIG. 3A, there is one tree for each sentence (S). Each of the trees is subdivided into a noun phrase (NP) and verb phrase (VP). The tree representing the first sentence (on the left hand side of FIG. 3A) is further divided into a noun (N) branch, a verb (V) branch, and another noun phrase (NP) which has a determiner (DET), a modifier (MOD), and a noun (N). The second sentence, as represented on the right hand side of FIG. 3A, has one branch with a prepositional phrase (PP) and a noun (N), and one branch with a verb (V) and another prepositional phrase (PP). Both prepositional phrases (PP) have a preposition (P) and a noun (N).

Figure 3B:
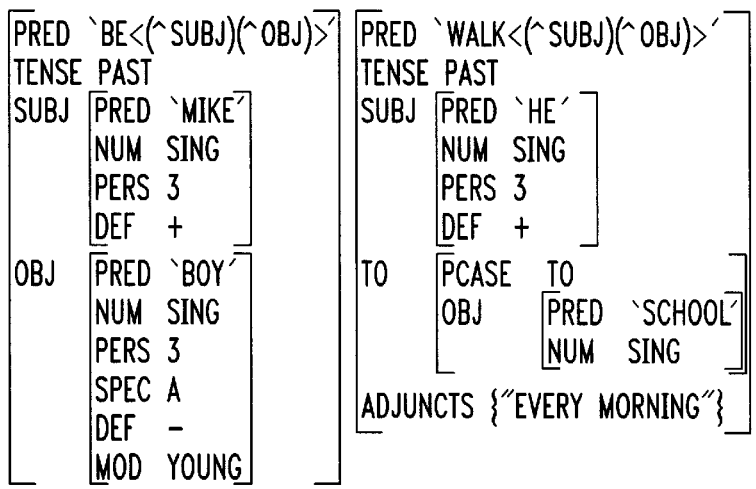

In a next step, the function of the words is identified, as schematically illustrated in FIG. 3B. The following abbreviations are used in this Figure: PRED (predicate); SUBJ (subject); OBJ (object); NUM (number), SING (singular); PL (plural); PERS (person); 3 (third person); DEF (definitness); +(definite); −(indefinite); SPEC (specification); MOD (modifier); PCASE (prepositional case).

Figure 3C:
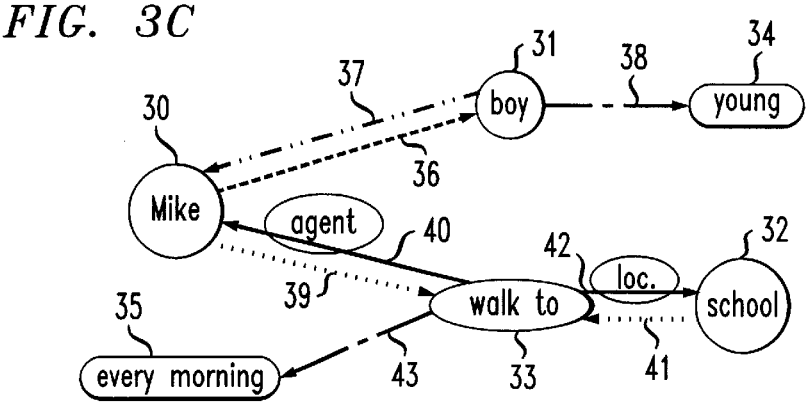

Finally, the semantic preprocessor 17 generates an input network (formal network) 18, which is shown in FIG. 3C. This network comprises three objects 30–32. There is an upward similarity pointer 36 and a corresponding downward similarity pointer 37 between the first object 30 (Mike) and the second object 31 (boy) which indicates that 'Mike' is 'a kind of' 'boy'. The second object 31 (boy) has an attribute pointer 38 which points to the attribute 34 (young). There is a horizontal functional pointer 39 between the first object 30 (Mike) and the relation 33 (walk to), and a role pointer 40 in the reverse direction, which is at the same time a relation (agent). An attribute pointer 43 points to the time attribute 35 (every morning). A functional pointer 41 points from the third object 32 (school) to the relation 33 (walk to), and a role pointer 42 in the reverse direction, which is at the same time a relation (location). It is to be noted that the above details are merely given to describe how an input network can be obtained and what its structure might be.

Once the input network 18 is created, the semantical processing commences. This can be done following any one of three procedures that lead to an equivalent result, the "resulting semantic network" 13.

1) The semantic processor 19 takes the input network 18 and locates subset in the knowledge database 11 that is deemed to be the best fit for all semantical units in the input network 18. This subset is then called the resulting semantic network 13.
2) The semantic processor 19 takes the input network 18 and expands it with related semantical units from the knowledge database 11. This expanded input network is then called the resulting semantic network 13.
3) The semantic processor 19 creates a new fractal hierarchical network of semantical units and pointers from the input network 18 and the knowledge database 11, where the components are selected according to a matching algorithm. The newly created fractal hierarchical network is then called the resulting semantic network 13.

The resulting semantic network 13 (created by any of the above processes) reflects both the general meaning and the individual aspects of the input string 12 and is—like the knowledge database 11—represented by a fractal hierarchical network of semantical units and pointers. The creation of the resulting semantic network 13 by any of the above processes is performed by a matching algorithm with data in the knowledge database 11 and by information extraction from this knowledge database 11. This is only possible if the structure of the resulting semantic network 13 and the knowledge database 11 are similar.

There are different ways to implement the semantic processor 19. The actual implementation depends on the question whether one wants a subset to be defined within the knowledge database 11 (1st implementation), the input network 18 to be expanded (2nd implementation), or a new network 13 to be generated (3rd implementation).

Semantic processor: Note that the implementation of the semantic processor depends on the environment in which is going to be used. The semantic processor of the first and the second embodiment (FIGS. 2A and 2B, respectively) differs from the semantic processor of the third embodiment (FIG. 2C).

According to the first and second embodiment (FIGS. 2A and 2B), the semantic processor 14 creates a first guess of the resulting semantic network 13 by assigning semantical units, roles (such as "agent", "object", "source/destination", "instrument", "location", etc.) and attributes to segments or individual semantical units of the input string 12. Then the semantic processor 14 reads out the possible subsets from the knowledge database 11 that are associated with the various segments or semantical units of the input string 12. It performs a matching of semantical units, attributes, and roles of the above guess with information from the knowledge database 11 through inheritance, implementation and overwriting rules.

According to the third embodiment (FIG. 2C), the semantic processor 19 creates a first guess of the resulting semantic network 13 by assigning semantical units, roles (such as "agent", "object", "source/destination", "instrument", "location", etc.) and attributes to the individual semantical units discovered by the semantic preprocessor 17. Then the semantic processor 19 reads out the possible subsets from the knowledge database that are associated with the various objects of the input string 12. It performs a matching of semantical units, attributes, and roles of the above guess with information from the knowledge database 11 through inheritance, implementation and overwriting rules.

Prejudgement: As next step, a "theme"-matching (or prejudgement) might be carried out by the semantic processor 14 or 19. It chooses a theme from the set of possible "themes" which influences the semantical distances of semantical units in the knowledge database 11 and verifies how well a segment or semantical unit of the input string matches with its (suspected) counterpart in the abstract knowledge database. Note that for this evaluation the semantic processor 14 or 19 retrieves the requested information (the local network around the suspected semantical unit) from the knowledge database 11. For this purpose, the semantic processor 14 or 19 uses the following information: a semantical unit (an entry in the knowledge database 11), a possible theme (defines how to adjust the weights), and a threshold (defines where to cut off the network around the given semantical unit in the knowledge database 11). Then the retrieved local network from the knowledge database 11 and the given concrete segment or semantical unit from the input string are compared to find out just how close the second comes to being an instance of the first. This measure ('fitness') yields a likelihood for the semantical unit classification (which is of course 'theme'-dependent). Finally, the retrieved local networks are compared to find the best combination if multiple possibilities (i.e. multiple matching semantical units in the knowledge database) were encountered. The whole task is done iteratively for all known semantical units and themes until a good (preferably the best) match is found, e.g. the resulting semantic network 13 converges to a stable state (the "meaning").

According to the third embodiment of the present invention, the information contained in the input network 18 is expanded by adding knowledge from the knowledge database 11. To avoid adding the whole content of the knowledge database 11, the expansion process might be self-controlled by a theme-prejudgement mechanism (derived e.g. by condensing semantical units into more abstract semantical units, or by counting the numbers of connections at individual semantical units in the input network 18 or semantic network 13). The prejudgement might be continuously updated and can even be dramatically corrected if a contradiction or a change of theme is discovered. In addition, it determines and/or alters the weights in the knowledge database 11, so that if, for instance, a semantical unit's link to another semantical unit is increased, then the second semantical unit's neighbors from the knowledge database 11 will also be added to the resulting semantic network 13 since they may be relevant within the (currently supposed) theme (semantic enhancement). Finally, if an input string 12 is rather long, then the prejudgement might even have a hierarchical structure (i.e. abstracts of abstracts).

Resulting Semantic network: The resulting semantic network 13 consists of self-similar semantical units and pointers giving it a structure of a fractal hierarchical network. Preferably, the resulting semantic network 13 has a structure similar to the one of the knowledge database 11, thus allowing a comparison between the two. All possible interpretations and (re)actions of the inventive system to textual information contained in an input string 12 are part of the knowledge database, so that comparing the resulting semantic network 13 to the knowledge database 11 is equivalent to understanding the meaning of the textual information contained in the input string 12.

Once the original information carried by the input string 12 is analyzed, as described above, one might:

provide a summary or abstract which summarizes the original information according to predefined rules;

fill in fields of a questionnaire about the input string 12 (such as a form, for example) with appropriate information;

answer individual questions;

pose questions, e.g., to better understand the situation;

engage in a discourse with a user, for example, to resolve unresolvable disambiguities;

exchange information with another system, or retrieve information from another system;

extract meaning;

take steps or measures depending on the interpretation of the original information, i.e., the understanding of the meaning of the input string 12 can result in an adequate reaction of a system, which could be a predetermined action triggered if a particular textual information is determined to be comprised in the input string 12.

This may be done by an a semantic postprocessor 21 that creates an appropriate output 15.

It is to be noted that the result of the inventive approach depends on the quality of the knowledge database 11. It is immediately obvious that a system for the processing of insurance claims requires an appropriate knowledge database. If one tried to interpret the original information carried in an input string derived from a letter which was sent by, an insured person to his insurance agency in the light of a music knowledge database, the result would most likely be nearly useless.

In the following, an exemplary algorithmic description of a semantic processor is given. The algorithm below might be used for processing a sentence.

```
=== beginning of algorithmic description ===========================
For all semantical units in input
string (omit "be" and "have")               // suppose there are N semantical units
{
    For all fitting knowledge database
    entries (string match)                  // suppose there are n_i
                                            //(1<=i<=N)
    {
        Create semantical unit instance
        Inherit all possible attributes from knowledge database
        If (Object) Inherit all possible relations from knowledge database (including
            attached roles)
        If (relation) Inherit all possible role objects from knowledge database
        Compute isolated fitness:
        {
            f_i:=1 / sqrt(n_i)
            Adjust for implemented attributes: good fit: +25% rel., bad fit: -10% rel.
            Adjust for implemented relations: good fit: +10% rel., bad fit: -50% rel.
            Adjust for implemented roles: good fit: +10% rel., bad fit: -50% rel.
        }
        Find local neighborhood:
        {
            Set potential of semantical unit to sqrt(k/m)
                // k =    # appearances of semantical unit in story up
                            to present sentence
                // m =    total number of semantical units in story up
                            to present sentence
            Propagate potential across weights in knowledge database
            Attach everything above min. threshold t_min=0.3
        }
    }
} // yields n_1+ ... +n_N local neighborhoods
For all combination of local neighborhoods    // there are n_1* ... *n_N combinations
{
    Compute local fitness adjustment (cellular automat method):
    {
        Count how many double, triple, etc. overlaps of objects (l_2(t), ..., l_N(t))
            // Note that the l_i depend on threshold t
        lfa_i = max_{tmin<=t<=1} { ½ + 1/ πArcTan(20 t - 10 + 2 sqrt( Σ_{=2}^N i l_i/ N) }
            // May improve this formula by making it "source" dependent,
            // i.e. overlaps between subject and predicate count more than others.
    }
    Adjust fitness of each semantical unit in combination with calculated local
    fitness adjustment
    Compute total fitness of combination:
    {
        F_i = (30% pred. fitness + 30% subj. fitness + 20% obj. fitness + 20% other)
            // all of the above relative to 100%, in case any of the categories is
            // missing or multiply present.
    }
}
Pick combination with highest total fitness as correct sentence network
Connect semantical units according to predicate-argument structure of input network.
=== end of algorithmic description ===========================
```

Figure 4:
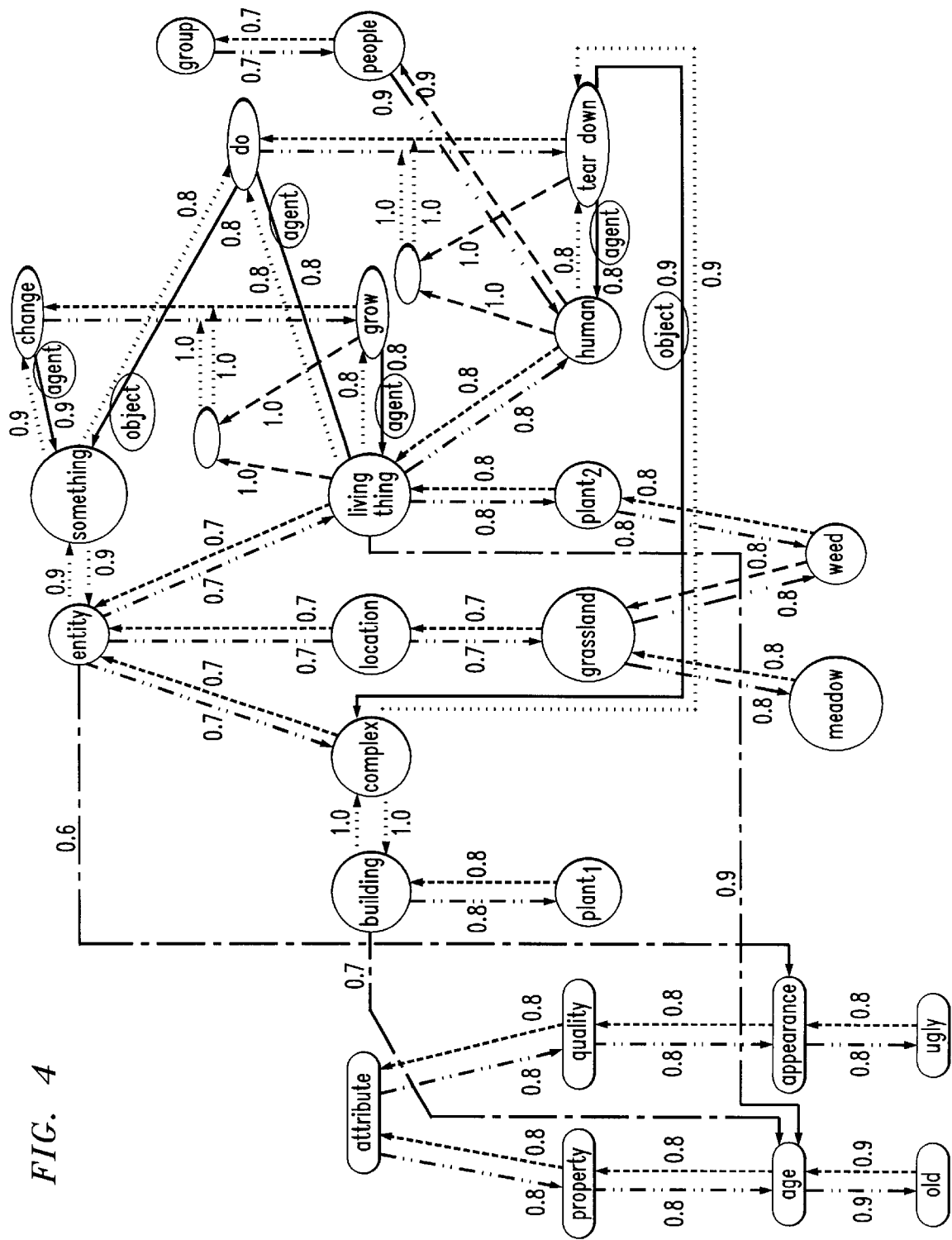
FIG. 4 illustrates a fractal hierarchical knowledge database, in accordance with the present invention.

The operation of a system according to the three embodiments of the present invention is described in connection with the following text comprising three sentences. The information contained in these three sentences is expanded using knowledge from a knowledge database 11 which is shown in FIG. 4. As can be seen from this Figure, the knowledge database comprises the semantical units and pointers illustrated in FIG. 1.

Input string comprising three sentences
I. There is an old plant on a meadow.
II. Weeds are already growing next to it.
III. Because the plant is ugly, people will tear it down.

Figure 5:
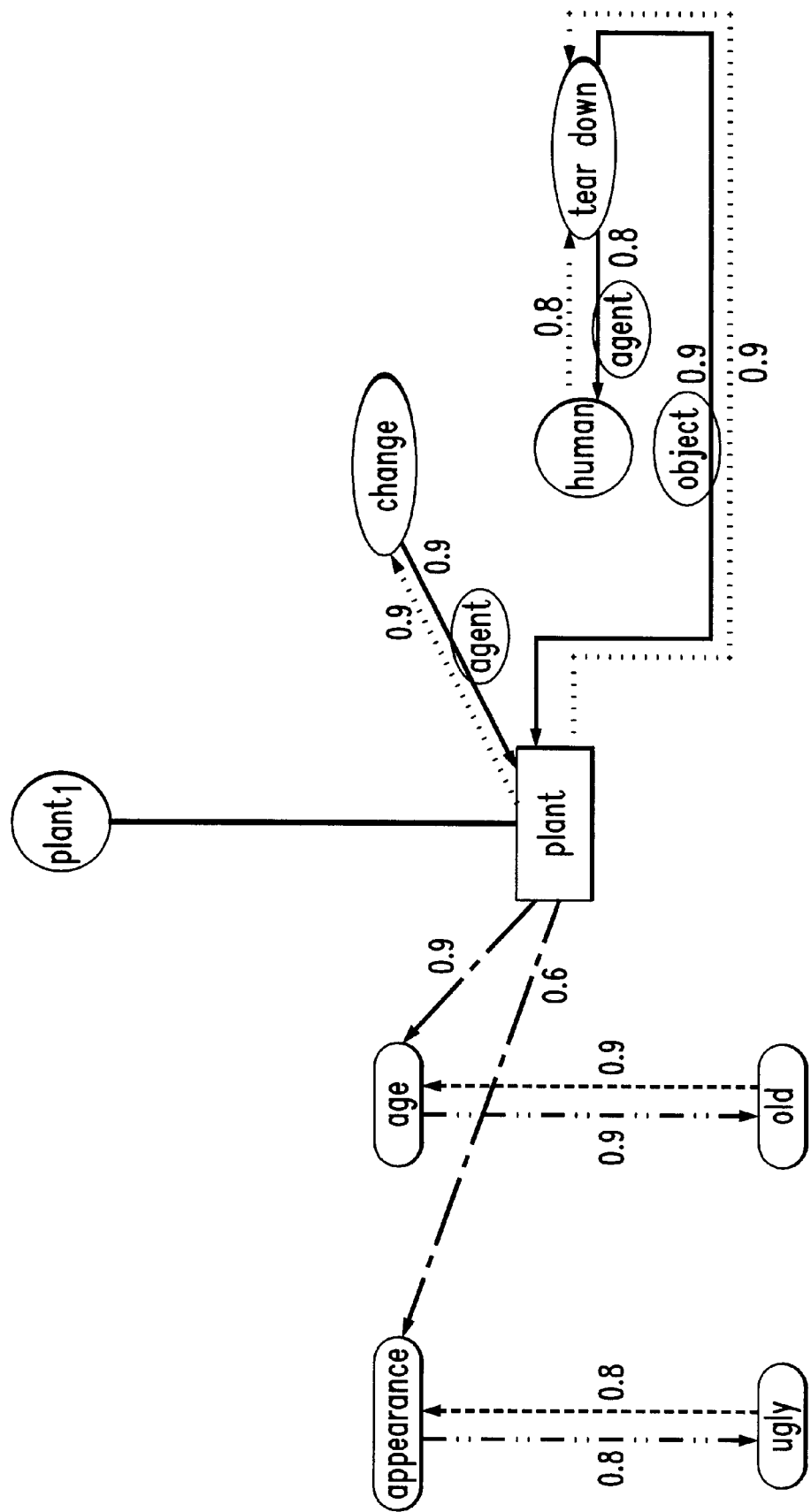
FIG. 5 illustrates inherited attributes and relations of 'plant$_1$', in accordance with the present invention.
Figure 6:
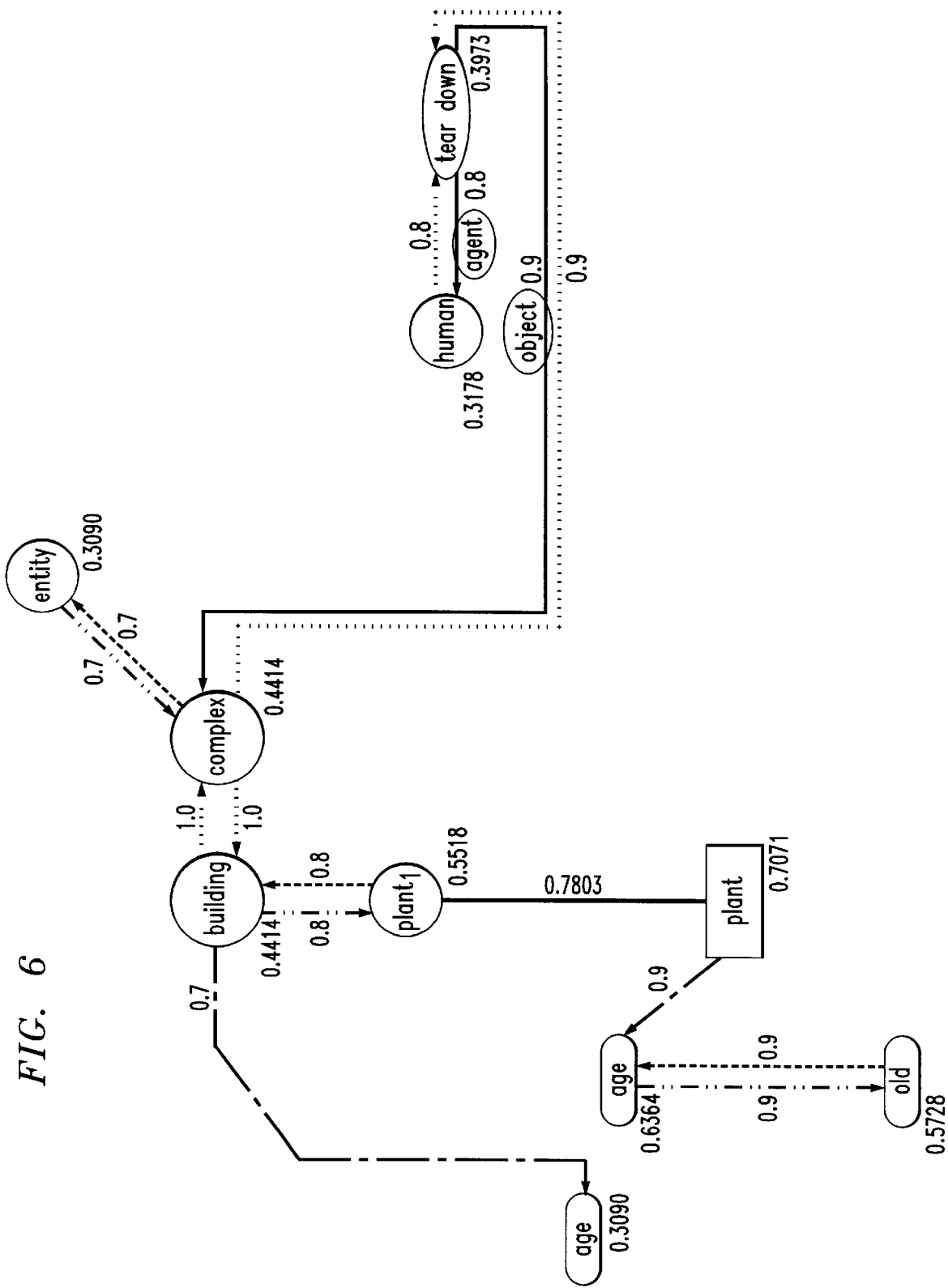
FIG. 6 illustrates a local network around 'plant$_1$', in accordance with the present invention.

Processing of sentence I (comments are included in parentheses [ . . . ]):

string 12. In the present example there are two subsets for the object 'plant'. The first subset is shown in FIG. 6. Since the threshold $t_{min}$ is 0.3 in the present example, all semantical units outside the respective subset are suppressed. The plant has an isolated fitness of $1/\sqrt{2}=0.7071$ since two plants (plant$_1$ and plant$_2$) were found in the knowledge database 11, while the meadow has an isolated fitness of $1/\sqrt{1}=1.0$ since only one meadow was found in the knowledge database 11. All possible attributes and relations associated with the object 'plant' are illustrated in FIG. 5. The words 'age' and 'old' are implemented attributes of the object 'plant' and are shown as attributes in FIG. 6. Note that there are no relations implemented in the first sentence of the present example. According to the present invention, a classification prob-

Figure 7:
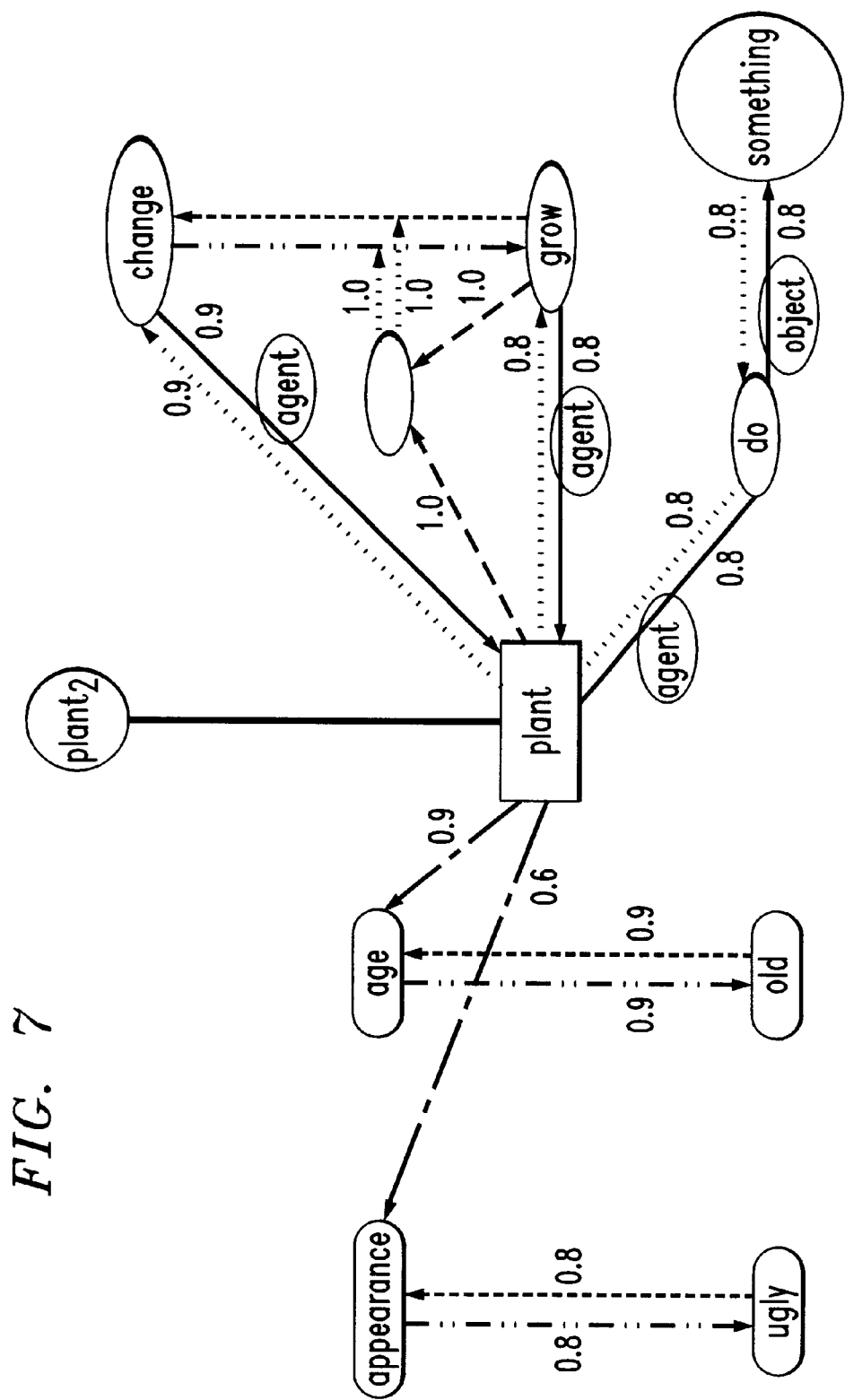
FIG. 7 illustrates inherited attributes and relations of 'plant$_2$', in accordance with the present invention.

```
objects: predicate:    be <SUBJ> <LOC>
         subject:   plant                            [first semantical unit]
                    attribute: old
         location:  meadow                           [second semantical unit]
                    preposition: on
N = 2, n₁ = 2, n₂ = 1    [There are two objects, i.e. N = 2. There are two 'plants' in the
                          knowledge database 11 (referred to as plant₁ and plant₂), i.e. n₁ = 2.
                          The word 'meadow' appears only once, i.e. n₂ = 1. FIGS. 5, 7, and 9
                          show the inherited possible attributes and relations of both
                          semantical units.]
Compute isolated fitness and potential (plant):
    f₁ = 1 / sqrt(2) + 25% rel = 0.7071 + 0.0732 = 0.7803   [isolated fitness of plant₁ and
                                                             plant₂. Plant implements
                                                             possible attribute 'age']
    p₁ = sqrt(1/2) = 0.7071                          [isolated potential of plant₁ and
                                                      plant₂.]
Compute isolated fitness and potential (meadow):
    f₂ = 1 / sqrt(1) + 0% rel. = 1.0                 [isolated fitness of meadow. No
                                                      implementations]
    p₂ = sqrt(1/2) = 0.7071                          [isolated potential of meadow]
for propagation of potentials see FIGS. 6, 8, and 10
there are 3 local neighborhoods (subsets) and 2 combinations
combination 1 (plant₁ and meadow):
    no overlaps above t_min = 0.3                    [there is no relation between plant₁
                                                      and meadow; the threshold t_min is 0.3
                                                      in the present example]
    lfa₁ = 0                                         [no change in fitness]
    F₁ = 60% subj. fit. + 40% obj. fit. = 0.6 * 0.7803 + 0.4 * 1.0 = 0.8682   [fitness of
                                                                              combination 1]
combination 2 (plant₂ and meadow):
    l₂ = 3 (0.3 <= t <= 0.3531); l₂ = 2 (0.3531 < t <= 0.3620);
    l₂ = 1 (0.3620 < t <= 0.4414); l₂ = 0 (0.4414 < t <= 1.0)   [For overlaps see FIGS.
                                                                 8 and 10]
    lfa₂ = max { . . . } = 0.7201
    f₁ = 0.7803 + 72.01% rel. = 0.7803 + 0.1582 = 0.9385   [improved fitness of plant₁ ]
    f₂ = 1.0 + 72.01% rel. = 1.0 + 0 = 1.0                 [improved fitness of meadow]
    F₂ = 60% subj. fit. + 40% obj. fit. = 0.6 * 0.9385 + 0.4 * 1.0 = 0.9631   [fitness of
                                                                              combination 2]
```

Please note that the above three sentences (input string 12) are selected to show how the present invention deals with information which is ambiguous. Sentence I might either refer to a living thing (plant$_2$ in FIG. 4), or a building (plant$_1$ in FIG. 4). The above algorithms are defined and optimized such that the inventive system can determine to which semantical units in the knowledge database 11 the segments or semantical units in the input string 12 are associated. The system 10 processes the first sentence I. Based on the above equations, the system 10 determines that it is more likely ($F_2>F_1$) that in this first sentence I plant refers to a living thing (plant$_2$). This conclusion is mainly influenced by the fact that there is no association in the knowledge database 11 between the object 'meadow' and the object 'plant$_1$'.

The inventive system 10 identifies a subset (local network) for each segment or semantical unit in the input string 12. In the present example there are two subsets for the object 'plant'. The first subset is shown in FIG. 6. Since the threshold $t_{min}$ is 0.3 in the present example, all semantical units outside the respective subset are suppressed. ability (adjusted isolated fitness) is calculated which gives an indication as to whether the plant in the input string 12 is likely to refer to the plant$_1$ or plant$_2$ in the knowledge database 11. In the present example, the classification probability is $1/\sqrt{2}+bonus=0.7803$. The bonus is added because the attribute 'age' with value 'old' is a possible attribute for both 'plant$_1$', and 'plant$_2$'. Next, the isolated potential of the object 'plant' is calculated to $\sqrt{1/2}=0.7071$, because there is one appearance of the object 'plant' and there are a total of two semantical units ('plant' and 'meadow') in the string up to the present sentence I. The potential of 'plant$_1$' is calculated by multiplying the classification probability and the isolated potential of 'plant'. The potential of 'plant$_1$' is $0.7803 \times 0.7071 = 0.5518$, which is above the threshold of 0.3. The weight (semantic distance) assigned to the pointers between 'plant$_1$' and 'building' is 0.8, in the present example. The potential of 'building' is calculated to $0.5518 \times$ 0.8=0.4414 which is also above the threshold of 0.3. The weight (semantic distance) assigned to the pointers between 'building' and 'complex' is 1.0, in the present example, and the potential of 'complex' is calculated to: 0.4414×1.0= 0.4414, which is above the threshold of 0.3. The weight (semantic distance) assigned to the pointers between 'complex' and 'entity' is 0.7, in the present example, and the potential of 'entity' is calculated to: 0.4414×0.7=0.3090, which is above the threshold of 0.3. The potential of all other semantical units is below the threshold and these semantical units are thus deemed to be of no relevance. By means of the above calculations it was shown how the potential propagates through the network until a subset (local network) is identified. Note that the equations and algorithms can be modified.

Figure 8:
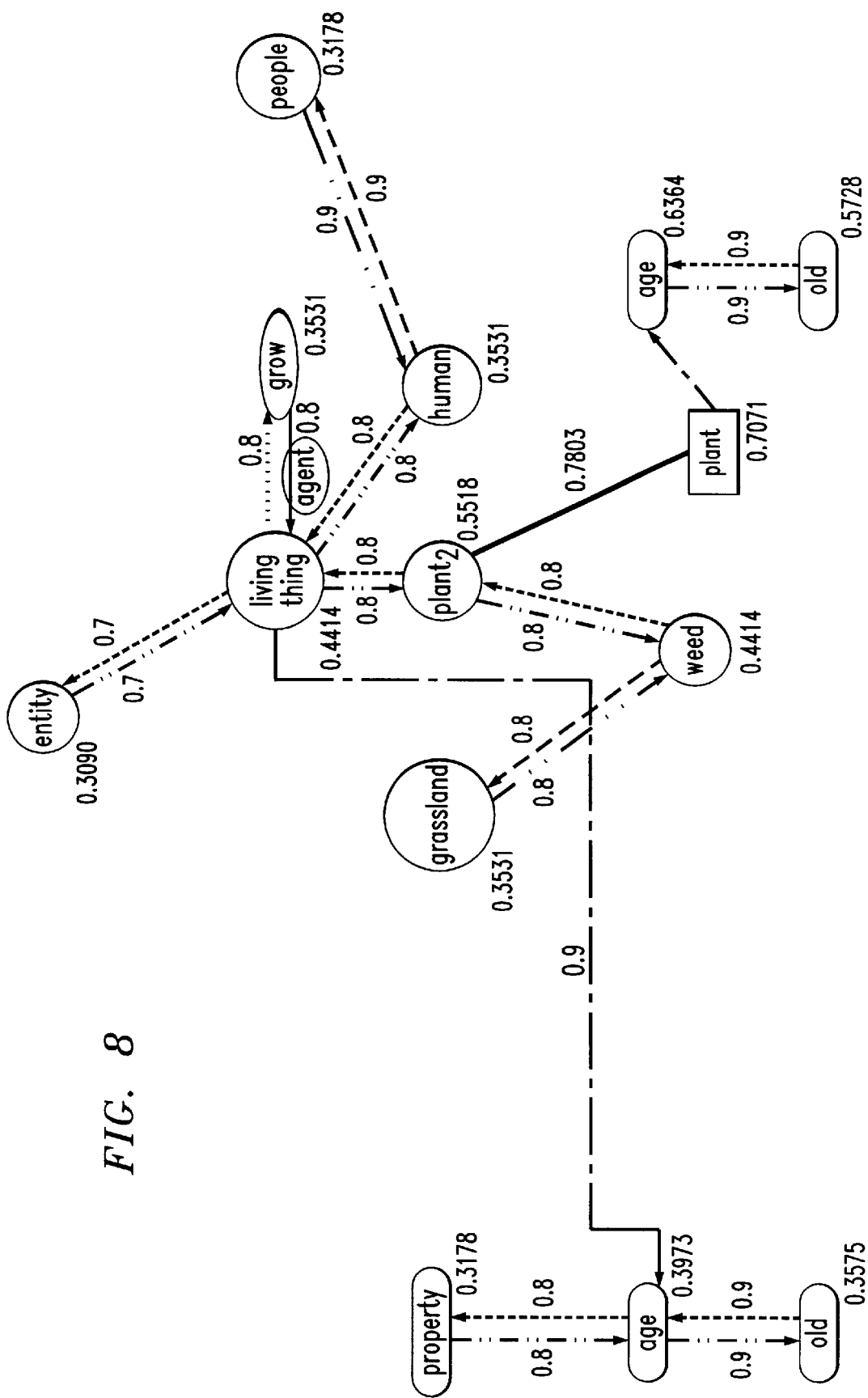
FIG. 8 illustrates a local network around 'plant$_2$', in accordance with the present invention.
Figure 9:
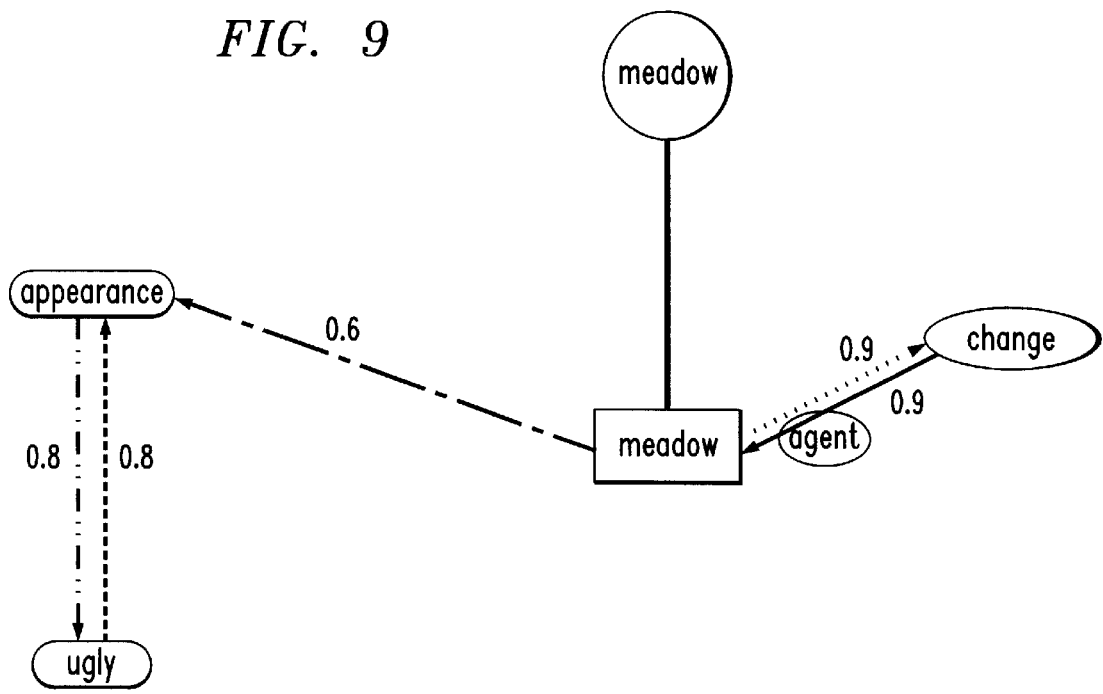
FIG. 9 illustrates inherited attributes and relations of 'meadow', in accordance with the present invention.

The subset (local network) of plant$_2$ is illustrated in FIG. 8. This subset is identified using the same approach as described in connection with FIG. 6.

If one now compares the subsets illustrated in FIGS. 6 and 8, it is difficult to tell which one of the two possibilities is a better representation of the textual information conveyed in the input string 12.

Figure 10:
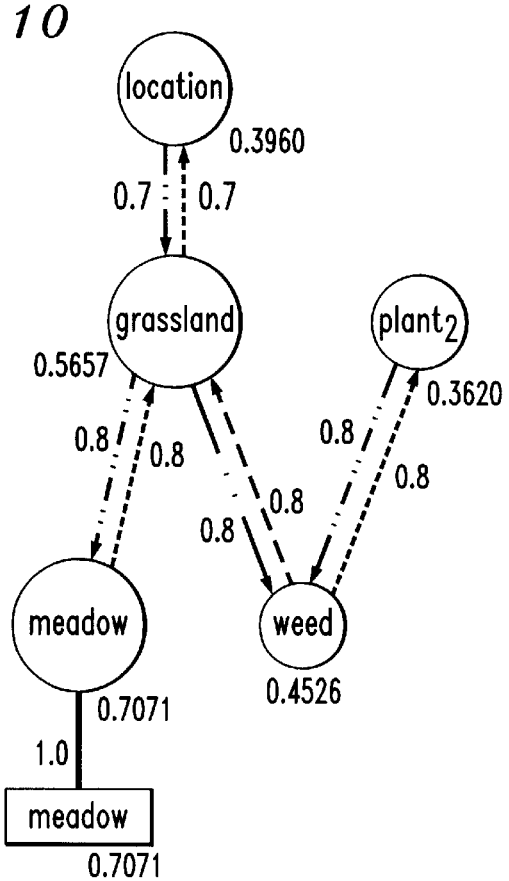
FIG. 10 illustrates a local network around 'meadow', in accordance with the present invention.
Figure 11:
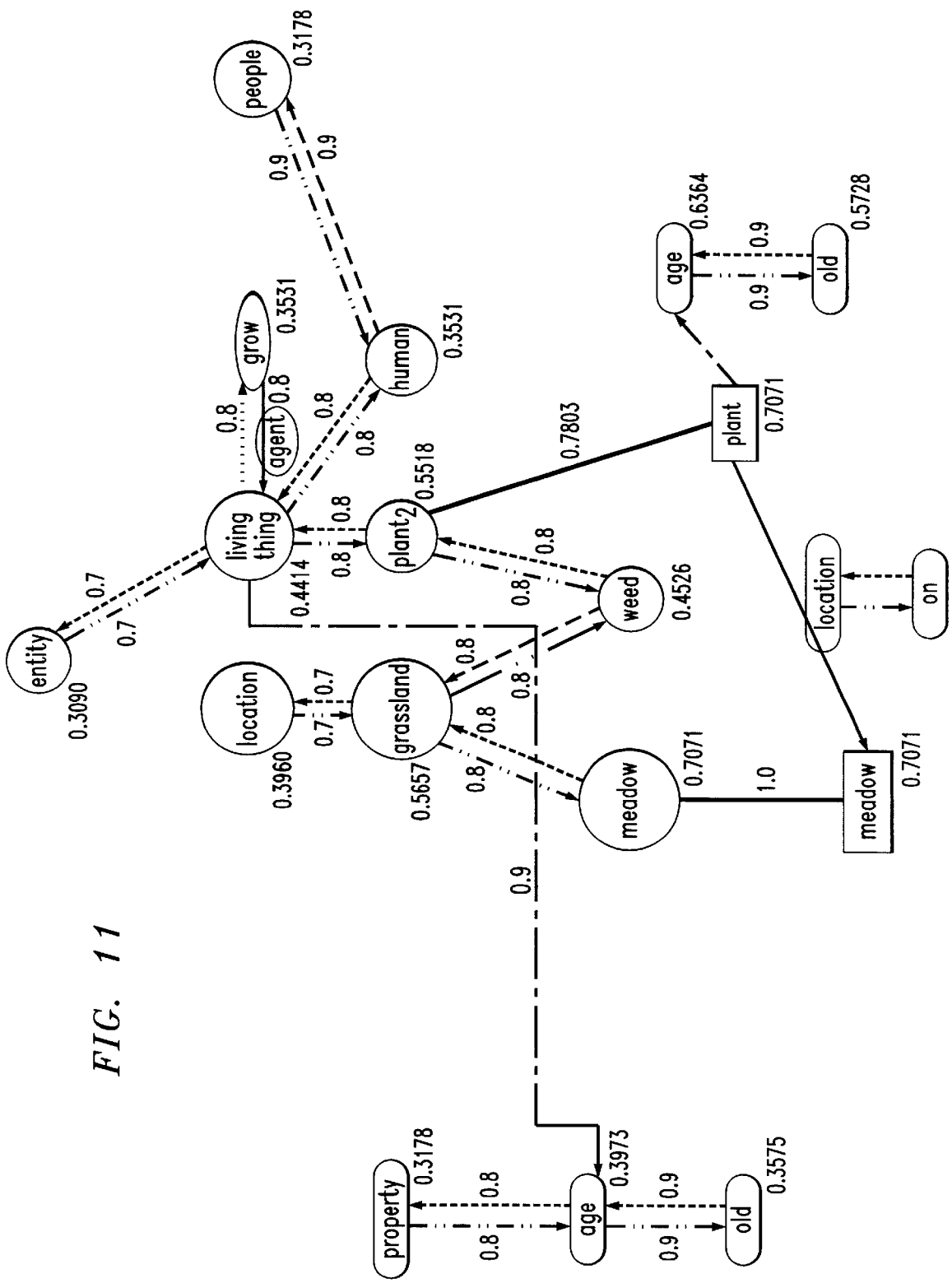
FIG. 11 illustrates a resulting semantic network of sentence 1, in accordance with the present invention.

Finally, a third subset is identified which corresponds to the second object 'meadow' in the input string 12. This subset is illustrated in FIG. 10. The isolated potential of meadow is 0.7071. The classification probability of the object 'meadow' in the input network as the object 'meadow' in the knowledge database is $1/\sqrt{1}=1.0$ since there is only one semantical unit 'meadow' in this database. This yields a potential of 'meadow' in the knowledge database 11 is also 0.7071. The semantic distance between 'meadow' and 'grassland' is 0.8 in the present example, and the 'grassland's' potential is calculated to 0.7071×0.8=0.5657. The semantic distance between 'grassland' and 'weed' is 0.8 in the present example, and the potential of 'weed' is calculated to be 0.5657×0.8=0.4526. The semantic distance between 'weed' and 'plant$_2$' is 0.8 in the present example, and the potential of 'plant$_2$' is calculated to 0.4526×0.8=0.3620, which is above the threshold. The semantic distance between 'grassland' and 'location' is 0.7 in the present example, and the potential of 'location' is calculated to 0.5657×0.7= 0.3960, which is above the threshold.

According to the present example we now have three subsets (local networks) for the two semantical units in the input string 12. In a next step these subsets are now combined to obtain a resulting semantic network. In order to ensure that the resulting semantic network properly reflects what textual information was conveyed in the input string 12, the most likely combination of subsets has to be selected. There are different ways to do this. The approach described here starts with deriving all possible combinations of the local networks. In the present example, these are the combinations "plant$_1$+meadow" (combination 1) and "plant$_2$+meadow" (combination 2), since all semantical units must appear exactly once in each combination. Then the overlaps in the local networks are determined for each combination. In combination 1 there is no overlap, while in combination 2 the semantical units "weed", "grassland", and "plant$_2$" have an overlap (i.e. they appear in the local networks of both "plant$_2$" and "meadow"). Therefore, the semantical units in combination 2 earn a bonus (local fitness adjustment) calculated from the formula $$\text{If } a_2 = \max_{t_{min} \leq t \leq 1} \left\{ 1/2 + 1/\pi \text{ ArcTan}\left(20t - 10 + 2\sqrt{\sum_{i=2}^{N} il_i / N}\right)\right\}.$$

If one observes that for $0.3=t_{min} \leq t \leq 0.3531$ we have $l_2(t)=3$, for $0.3531 \leq t \leq 0.3620$ we have $l_2(t)=2$, for $0.3620 \leq t \leq 0.4414$ we have $l_2(t)=1$, and for $0.4414 \leq t \leq 1.0$ we have $l_2(t)=0$, while $l_i(t)=0$ for all $i>2$, this formula yields $1fa_2=0.7201$, that is, the previous isolated fitnesses of meadow and plant$_2$ are increased by 72.01% relative to 1.0, thus yielding the respective values for "plant as plant$_2$" of 0.9385 and "meadow as meadow" of 1.0. Finally, the total fitness for each combination is calculated from the formula $F_1$ or $F_2$=(30% predicate fitness+30% subject fitness+20% object fitness+20% other). Since the percentages are relative to 100% and there is only one grammatical subject (plant) and one object (meadow), this yields the modified formulas and values $F_1$=(60% plant as plant, fitness+40% meadow as meadow fitness)=60%×0.7803+40%×1.0=0.8682; and $F_2$= (60% plant as plant$_2$ fitness+40% meadow as meadow fitness)=60%×0.9385+40%×1.0=0.9631 for combinations 1 and 2, respectively. Since $F_2>F_1$, the object "plant" is identified as "plant$_2$", the living thing. This identification may be used to select a theme (prejudgement) before processing the next sentence. Note that here also the equations and algorithms can be modified.

If one now also processes the other two sentences II and III, the system gets additional information which either leads to a reconsideration of a prior combination, or to a refinement of a combination. Note that the second sentence II talks about weeds. For the system this furthers the supposition of sentence I that plant refers to plant$_2$ as a living thing rather than a building. After having processed the third sentence III, this picture has to be revised, because this sentence contains the relation 'tearing it down'. This expression is never used in connection with living things in the object role (but only in the agent role). The third sentence thus seems to indicate that the first and second sentence should have referred to a building rather than a living thing. With this new theme selection sentence I and II may be reprocessed. The combination of subsets is dynamically changed until all textual information conveyed by an input string is processed. Due to this iterative approach it is possible to obtain a resulting semantic network that gives the best possible representation of the information carried in the input string.

The second sentence does not add any information which helps to better understand the meaning of the first sentence, because weeds can grow next to a building or next to a living plant. Since weeds and living plants are somewhat related, at this point it seems more likely that the first sentence refers to a living plant. The third sentence finally contains information which helps the system to 'understand' the meaning of the first, and second sentences. It is clear from the third sentence that in the other two sentences. 'plant' refers to a building.

The present invention can be used to provide systems that respond by creating meaningful outputs. In the following example the input is taken from a car accident report and output is automatically generated complying with certain classifications, e.g. what kind of cars were involved, what type of accident took place, or whose fault it was. Such a system might be used by insurance companies for the automated processing of insurance claims.

An example of an insurance case is used to illustrate further details and aspects of the inventive system.

The following text from an insurance claim form is to be analyzed using the inventive system:

"I was attempting to reversing park vehicle in front of a house I was visiting. Unfortunately there was already another car parked by the house. I tried to park close to vehicle and unfortunately put the vehicle into the wrong gear, reverse and not park (automatic vehicle). There were no warnings."

The semantic preprocessor 17 creates an input network 18 using standard parsing techniques. The sentences of the above input string are put into a predicate-argument-structure, that is, the predicate has various roles attached to it. The first sentence already exhibits a hierarchical structure, where the relative clause "I was visiting" is a modifier of the location 'house', but 'house' is also the (non-existing, but referred) object in the relative clause, as is always the case with relative clause constructions. A few straightforward transformations are done, such as splitting the third sentence after the conjunction 'and' into two sentences and attaching the attribute 'automatic' to the proper noun 'vehicle'. Finally, certain parts of the input network might be combined since the clause "reverse and not park" only explains what "wrong gear" means.

The semantic processor 14 then acts upon this input network. It accesses the knowledge database 11 for additional information, if necessary. In the present example an illustration is given of the fact that the vehicle is 'automatic'. Here one needs to understand what 'automatic' means in conjunction with 'vehicle', and what the possible conclusions are. To expand the information in the input network one makes use of the knowledge around 'car' in the knowledge database 11. 'Car' is kind of (has hypernym) 'vehicle', 'transmission' is part of (has meronym) 'car', which in turn may be 'automatic' or 'manual'. If it is 'automatic' it has 'gears' which correspond to (interact with) a certain 'speed' of the object 'car'. In particular, 'gears' are 'park' or 'reverse'. The speed of the particular 'gear P' is zero (a value of the attribute 'speed'), while the speed of the particular 'gear R' is between zero and minus 10 km/h (a possible range of the value, where the minus-sign indicates the direction of movement).

In addition, one may have an entry that 'have an accident' is a 'relation' between two 'cars' (objects). Any two semantical units that exist as real things may have a relation of some kind, and that relation may have an attribute 'relative speed', which contains a formula such as 'equals absolute value of speed of semantical unit 1 minus speed of semantical unit 2', where the individual speeds refer to the attributes 'speed' of the respective semantical units attached to the relation. The relation 'have an accident' thus inherits the attribute 'relative speed', and in the formula the speeds of the two semantical units is replaced with the speed of the two cars. To obtain the 'relative speed' in the present case, one knows that one car is parked, and the value of the attribute 'speed' of a car is set to zero if the car is parked (this is stored in the formula to compute the speed of a car), so the speed of the first car is zero. For car two, one knows that it is in reverse, so its speed is between zero and minus 10 km/h, and, therefore, the 'relative speed' is between 0 and 10 km/h.

Finally, the knowledge database may contain further information about 'automatic vehicles', such as if 'gear' is not 'P' or 'N', and the brake is not applied, then speed is at least 5 km/h (reflecting that automatic vehicles tend to crawl). This scenario may be brought into the context: since there was an accident, the relative speed cannot have been zero, so it is possible that the driver put the car into 'R' but did not apply the brakes, thus bumping into the parked car at crawling speed.

Once the textual information conveyed in the input string is expanded (transformed) into a resulting semantic network, the insurance agent, for example, might ask questions which the system then can answer. Likewise, the system might create a printout in a standardized form which gives an objective and informative description of what has happened. The system might even propose actions. It might for example authorize the reimbursement of expenses which somebody involved in the accident claimed.

Proposed are schemes and systems based on a special model of textual information and natural language. According to our model, natural language as well as textual information consists of semantical units and pointers which are grouped at different levels of hierarchy and are all of a similar type. In addition, we use weights to express the semantical distance of two linked semantical units. Thus, the knowledge database, speech, and questions are all represented in what is herein called a fractal hierarchical network. The local network of a speech or a question is created by locating its semantical units, possible relations, possible attributes, and possible roles in the knowledge database and copying the semantical neighborhoods from the knowledge database, whereby overlapping areas are increased. Finally, the overlap of a speech and a question network yields a resulting semantic network which can be used to e.g. generate a meaningful answer or reaction.

The present invention can also be used for data mining purposes. The inventive approach allows to extract meaning from the textual information conveyed in input strings and can process huge amounts of information. It can determine relationships and trends that were previously invisible or unclear. The inventive approach allows to automatically apprehend meaning of input strings of any length with a previously unmatched quality.

What is claimed is:

1. A method of processing textual information, comprising the steps of:

segmenting an input string which includes textual information into segments; and combining the segments with semantical units from a knowledge database representing a network of hierarchically arranged semantical units which are similar across hierarchies, the combining step generating a resulting semantic network of hierarchically arranged semantical units which are similar across hierarchies.

2. The method of claim 1, wherein at least one of the segments is one of related to a semantical unit and similar to a semantical unit, and wherein there are at least n semantical units in the knowledge database with n being not less than 2.

3. The method of claim 2, wherein a semantical unit is a set containing one or more pieces of information.

4. The method of claim 3, wherein the semantical unit includes a name and one or more pointers to other semantical units.

5. The method of claim 2, wherein the combining step comprises the following steps:

identifying a matching semantical unit in the knowledge database, the matching semantical unit being related to the $j^{th}$ segment of the input string;

determining a fitness of the matching semantical unit by taking into consideration the possible associations of the semantical unit; and repeating the identifying and determining steps until a matching semantical unit is found for j=1, . . . , m segments of the input string.

6. The method of claim 5, wherein combining of the segments with the matching semantical units is done-such that the resulting semantic network includes semantical units that are related to the textual information conveyed in the input string.

7. The method of claim 5, whereby identifying and determining steps are carried out m times if there are m matching semantical units in the knowledge database which are related to the $j^{th}$ semantical unit of the input string, and wherein one of the m matching semantical units is used to generate the resulting semantic network.

8. The method of claim 5, wherein the matching semantical units are combined with each other to form the resulting semantic network if a corresponding classification probability indicates that the respective semantical units have been correctly matched with the semantical units in the knowledge database.

9. The method of claim 5, wherein the possible associations of the semantical unit are at least one of possible attributes, possible relations and possible roles.

10. The method of claim 5, wherein at least one of attributes, relations and roles of a semantical unit in the input string are used to determine whether a matching semantical unit in the knowledge database is better than other matching semantical units in the knowledge database.

11. The method of claim 10, wherein the determination of whether a matching semantical unit in the knowledge database is better than other matching semantical units in the knowledge database includes determining whether a matching semantical unit in the knowledge database has a higher fitness than other matching semantical units in the knowledge database.

12. The method of claim 5, wherein the fitness is increased if at least one of generally accepted attributes, relations and roles are used in connection with a semantical unit.

13. The method of claim 5, wherein the fitness is decreased if at least one of non-generally acceptable attributes, relations and roles are used in connection with a semantical unit.

14. The method of claim 5, wherein the identifying and determining steps are repeated if an additional input string is received until a resulting semantic network is generated.

15. The method of claim 5, wherein one or more self-similar algorithms are used when carrying out the identifying and determining steps.

16. The method of claim 2, wherein the input string is transformed into an input network including the semantical units.

17. The method of claim 16, wherein the resulting semantic network is obtained from transforming the input network.

18. The method of claim 16, wherein the input network is generated by at least one of syntactic parsing and grammatical parsing.

19. The method of claim 1, wherein the resulting semantic network is employed for automated apprehension of the textual information conveyed in the input string.

20. The method of claim 1, whereby the knowledge database and the resulting semantic network include one or more types of semantical units such as objects, relations, and attributes.

21. The method of claim 1, wherein the knowledge database and the resulting semantic network include one or more types of pointers.

22. The method of claim 21, wherein a pointer between two semantical units in the knowledge database has a weight corresponding to a semantical distance between the two semantical units, the weight being one of a fixed weight and a variable weight.

23. The method of claim 22, wherein an inverse of the weight represents a semantical distance between two semantical units which the pointer connects.

24. The method of claim 21, wherein one or more of the pointers describe mutual relationships between semantical units.

25. The method of claim 21, wherein at least one of the pointers is a directed associative connection between semantical units.

26. The method of claim 21, wherein at least one of the pointers is one of a hierarchical pointer, a horizontal pointer, a similarity pointer, a functional pointer, an attributional pointer and a role pointer.

27. The method of claim 1, wherein each semantical unit in the knowledge database receives a potential, the potential being one of a fixed potential and a variable potential.

28. The method of claim 1, wherein the resulting semantic network is a network identified within the knowledge database.

29. The method of claim 1, wherein the resulting semantic network is extracted from the knowledge database to form a new separate network.

30. The method of claim 1, wherein an input text is transformed into one or more input strings.

31. The method of claim 1, wherein a preliminary theme of the input string is determined allowing a quick identification of a preliminary subset of information within the knowledge database.

32. The method of claim 31, wherein the preliminary subset is revised.

33. The method of claim 32, wherein the preliminary subset is revised one of continuously and occasionally.

34. The method of claim 32, wherein the preliminary subset is revised when one of a contradiction and change of theme is determined.

35. The method of claim 1, further comprising the step of performing an action depending on the general meaning extracted from the input string.

36. The method of claim 1, wherein an action is performed by providing an answer if the input string is determined to include a question.

37. The method of claim 1, wherein the knowledge database includes a self-similar representation of semantical units and pointers across different scales.

38. The method of claim 1, wherein the knowledge database reflects the structure of an environment.

39. The method of claim 38, wherein the environment is a subset of the real world.

40. The method of claim 1, wherein text is transformed into input strings which are then processed string-by-string.

41. The method of claim 1, wherein speech is transformed into input strings which are then processed string-by-string.

42. The method of claim 41, wherein speech recognition is employed to transform the speech into said input strings.

43. A method of constructing a fractal hierarchical knowledge database representing a network of hierarchically arranged semantical units which are similar across hierarchies, comprising the steps of:
   recording semantical units;
   linking the semantical units by one or more pointers with other semantical units of the fractal hierarchical knowledge database; and
   assigning a weight to the one or more pointers.

44. The method of claim 43, wherein the one or more pointers are one of hierarchical pointers and horizontal pointers.

45. The method of claim 44, wherein at least one of the hierarchical and horizontal pointers is one of a similarity pointer, a functional pointer, an attributional pointer and a role pointer.

46. The method of claim 43, wherein the one or more pointers have one or more types associated therewith which describe associations between semantical units.

47. The method of claim 43, wherein at least one of the one or more pointers is a semantical unit.

48. The method of claim 43, wherein the weight assigned to the pointer is one of fixed and variable.

49. The method of claim 43, wherein one of a fixed and a variable potential is assigned to a semantical unit.

50. The method of claim 49, wherein the potential is assigned when the fractal hierarchical knowledge database is used for the automated apprehension of textual information conveyed in an input string.

51. The method of claim 50, wherein one of a fixed and a variable threshold is assigned to the fractal hierarchical knowledge database.

52. The method of claim 51, wherein the potential and threshold are used for subset determination.

53. The method of claim 43, wherein an inverse of the weight of the pointer represents a semantic distance between two semantical units which the pointer connects.

54. Apparatus for processing textual information, comprising:

a segmenter which segments an input string which includes textual information into segments;

a semantic processor coupled to the segmenter which combines the segments with semantical units from a knowledge database representing a network of hierarchically arranged semantical units which are similar across hierarchies, the combining operation generating a resulting semantic network of hierarchically arranged semantical units which are similar across hierarchies; and memory coupled to the semantic processor which stores the segments and the resulting semantic network.

55. The apparatus of claim 54, wherein at least one of the segments is one of related to a semantical unit and identical to a semantical unit, and wherein there are at least n semantical units in the knowledge database with n being not less than 2.

56. The apparatus of claim 55, wherein the semantic processor performs the following operations:

identifying a matching semantical unit in the knowledge database, the matching semantical unit being related to the $j^{th}$ segment of the input string such that a matching semantical unit is found for j=1, ..., m segments of the input string; and determining a fitness of the matching semantical unit by taking into consideration the possible associations of the semantical unit.

57. The apparatus of claim 56, further comprising a speech processing unit which transforms speech into the input string.

58. The apparatus of claim 57, wherein the speech processing unit performs speech recognition.

59. The apparatus of claim 54, wherein the apparatus is used for automated apprehension of the textual information conveyed in the input string.

60. The apparatus of claim 59, wherein a reaction is triggered depending on the apprehended information.

61. The apparatus of claim 54, further comprising a post-processor which transforms the resulting semantic network to create an output string.

62. The apparatus of claim 54, wherein the resulting semantic network is represented as a fractal hierarchical network of semantical units.

63. The apparatus of claim 54, further comprising a processor for processing the input string to generate an input network which includes the semantical units.

* * * * *